US012747987B2

(12) United States Patent
Borremans et al.

(10) Patent No.: US 12,747,987 B2
(45) Date of Patent: Sep. 29, 2026

(54) SPECTROMETER METHOD AND APPARATUS

(71) Applicant: Spectricity, Mechelen (BE)

(72) Inventors: Jonathan Borremans, Lier (BE); Andy Lambrechts, Herent (BE); Jerome Baron, Brussels (BE)

(73) Assignee: Spectricity, Mechelen (BE)

( * ) Notice: Subject to any disclaimer, the term of this patent is extended or adjusted under 35 U.S.C. 154(b) by 141 days.

(21) Appl. No.: 18/652,142

(22) Filed: May 1, 2024

(65) Prior Publication Data

US 2024/0302213 A1 Sep. 12, 2024

Related U.S. Application Data

(63) Continuation of application No. 18/174,223, filed on Feb. 24, 2023, now abandoned, which is a (Continued)

(30) Foreign Application Priority Data

Dec. 23, 2015 (EP) .................................... 15202374
Dec. 23, 2015 (EP) .................................... 15202382

(51) Int. Cl.
*G01J 3/40* (2006.01)
*G01J 3/28* (2006.01)
(Continued)

(52) U.S. Cl.
CPC . *G01J 3/40* (2013.01); *G01J 3/28* (2013.01); *G01J 3/2823* (2013.01); *G01J 3/36* (2013.01); (Continued)

(58) Field of Classification Search
CPC .... G01J 3/28; G01J 3/2823; G01J 3/36; G01J 3/16; G01J 3/0272
See application file for complete search history.

(56) References Cited

U.S. PATENT DOCUMENTS 4,322,807 A 3/1982 Chamran
4,870,483 A 9/1989 Nishigaki et al.
(Continued)

FOREIGN PATENT DOCUMENTS

CN 1347001 A 5/2002
CN 2491831 Y 5/2002
(Continued)

OTHER PUBLICATIONS

China National Intellectual Property Administration; 1st Office Action; Application No. 202110687540.1; Nov. 14, 2023; 11 pgs.
(Continued)

*Primary Examiner* — Thanh Luu
(74) *Attorney, Agent, or Firm* — Katz Ruby & Carle LLP; Kelly H. Hale

(57) ABSTRACT

A user device includes a spectrometer module adapted to acquire spectral information and output spectral data representing the acquired spectral information, memory adapted to store predetermined calibration data, a processing unit configured to substantially correct the spectral data using the stored calibration data and an electronic circuit module, The electronic circuit module includes a light sensitive area for detecting incident light of a plurality of wavelengths within a set wavelength interval, detected light of a plurality of wavelengths forming spectral data and the light sensitive area including a plurality of light detectors. Each light detector is adapted to detect light of a selected wavelength. The calibration data is based on a predetermined characteristic of the electronic circuit module, which has been configured to correct a wavelength detected by each light detector and the wavelengths detected by each light detector has a known relationship to a wavelength detected by a reference light detector.

18 Claims, 3 Drawing Sheets

Related U.S. Application Data continuation of application No. 16/442,254, filed on Jun. 14, 2019, now abandoned, which is a continuation-in-part of application No. 15/389,057, filed on Dec. 22, 2016, now abandoned, and a continuation-in-part of application No. 15/389,043, filed on Dec. 22, 2016, now Pat. No. 10,401,220.

(51) Int. Cl.

| | |
|---|---|
| ***G01J 3/36*** | (2006.01) |
| ***G01N 21/31*** | (2006.01) |
| ***G06F 3/14*** | (2006.01) |
| ***H04N 23/16*** | (2023.01) |
| ***H04N 23/60*** | (2023.01) |
| ***H04N 23/63*** | (2023.01) |
| ***H04N 23/67*** | (2023.01) |

(52) U.S. Cl.

CPC ............... *G01N 21/31* (2013.01); *G06F 3/14* (2013.01); *H04N 23/16* (2023.01); *H04N 23/63* (2023.01); *H04N 23/635* (2023.01); *H04N 23/64* (2023.01); *H04N 23/67* (2023.01); *H04N 23/675* (2023.01)

(56) References Cited

U.S. PATENT DOCUMENTS

| | | | | |
|---|---|---|---|---|
| 2002/0048055 | A1 | 4/2002 | Yushiya | |
| 2004/0075831 | A1* | 4/2004 | Suzuki | G01J 3/2803 356/328 |
| 2004/0257600 | A1 | 12/2004 | Hiromatsu | |
| 2006/0158647 | A1 | 7/2006 | Yao | |
| 2007/0064119 | A1 | 3/2007 | Komiya | |
| 2007/0188764 | A1 | 8/2007 | Nisper | |
| 2007/0223810 | A1 | 9/2007 | Sekine | |
| 2009/0173883 | A1 | 7/2009 | Kauffman | |
| 2009/0323060 | A1 | 12/2009 | Knipp | |
| 2010/0164044 | A1 | 7/2010 | Lee | |
| 2012/0200852 | A1 | 8/2012 | Tejada | |
| 2013/0153767 | A1 | 6/2013 | Savoy | |
| 2014/0012135 | A1 | 1/2014 | Freeman | |
| 2014/0118571 | A1 | 5/2014 | Dahlgren | |
| 2014/0268146 | A1 | 9/2014 | Hinrichs | |
| 2016/0146741 | A1 | 5/2016 | Shelley | |

FOREIGN PATENT DOCUMENTS

| | | | |
|---|---|---|---|
| CN | 101124462 | A | 2/2008 |
| CN | 100477952 | C | 4/2009 |
| CN | 101726358 | A | 6/2010 |
| CN | 101726361 | A | 6/2010 |
| CN | 103148942 | A | 6/2013 |
| CN | 104535186 | A | 4/2015 |
| CN | 104748849 | A | 7/2015 |
| EP | 0555907 | A1 | 8/1993 |
| EP | 0716538 | A2 | 6/1996 |
| JP | 63111429 | | 5/1988 |
| JP | 11112888 | A | 4/1999 |
| JP | 2001133226 | A | 5/2001 |
| WO | 2005117452 | | 12/2005 |
| WO | 2008014983 | | 2/2008 |
| WO | 2013064510 | A1 | 5/2013 |

OTHER PUBLICATIONS

China National Intellectual Property Administration; Office Action; Dec. 3, 20191; 5 pgs.

China National Intellectual Property Administration; Search Report; 201611198087.3; Jun. 17, 2020; 2 pgs.

European Patent Office; Extended European Search Report; EP Application No. 15202382.6; Jul. 4, 2016; 8 pgs.

European Patent Office; Office Action; Application No. 15202382.6; Dec. 8, 2021; 5 pgs.

European Patent Office; Office Action; EP 15202374.3; Sep. 22, 2021; 9 pgs.

European Patent Office; Partial European Search Report; EP Application No. 15202374.3; Jul. 22, 2016; 7 pgs.

Extended European Search Report dated Sep. 20, 2016 in European Application No. 15202374.3.

Fujiwara, Hisanaga; Passive Range Sensor Using Multi-Focus Images; IEEE International Conference on Intelligent Robots and Systems; IROS '96; Nov. 1996; pp. 104-111; vol. 1.

* cited by examiner

SPECTROMETER METHOD AND APPARATUS

CROSS REFERENCE TO RELATED PATENTS

The present U.S. Utility Patent Application claims priority pursuant to 35 U.S.C. § 120 as a continuation of U.S. Utility application Ser. No. 18/174,223, entitled "IMAGING DEVICE WITH SPECTROMETER AND METHODS FOR USE THEREWITH", filed Feb. 24, 2023, which is a continuation of U.S. Utility application Ser. No. 16/442,254, entitled "DEVICE FOR RECORDING SPECTRAL INFORMATION", filed Jun. 14, 2019, which is a continuation-in-part of U.S. Utility application Ser. No. 15/389,043, entitled "SPECTROMETER MODULE", filed Dec. 22, 2016, issued as U.S. Pat. No. 10,401,220 on Sep. 3, 2019, which claims foreign priority pursuant to 35 U.S.C. § 119(b) to European Patent Application No. 15202374.3, filed Dec. 23, 2015; all of which are hereby incorporated herein by reference in their entirety and made part of the present U.S. Utility Application for all purposes.

U.S. Utility application Ser. No. 16/442,254 further claims priority pursuant to 35 U.S.C. § 120 as a continuation-in-part of U.S. Utility application Ser. No. 15/389,057, entitled "USER DEVICE FOR RECORDING SPECTRAL INFORMATION", filed Dec. 22, 2016, which claims foreign priority pursuant to 35 U.S.C. § 119(b) to European Patent Application No. 15202382.6, filed Dec. 23, 2015; all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not applicable.

BACKGROUND OF THE INVENTION

Technical Field of the Invention

This invention relates generally to recording of spectral information.

Description of Related Art

In spectral sensing, it is desired to acquire spectral information of an object. Spectral sensing should be understood as spectral information being acquired, wherein light from the object is captured and spectral information is extracted. The spectral sensing may capture spectral information from the object, such as from a single point or from a region of the object. Spatial information may optionally also be acquired, such that the spectral information may also be spatially resolved. In spectral sensing, incident light relating to multiple ranges of wavelengths is detected. The spectral sensing may for instance be used in analysis of objects, such as for determination whether a substance having a specific spectral profile is present in the object.

The terms multi-spectral sensing and hyperspectral sensing are often used. These terms do not have established definitions, but typically multi-spectral sensing refers to spectral sensing using a plurality of discrete wavelength bands, whereas hyperspectral sensing refers to sensing narrow spectral wavelength bands over a continuous spectral range. Hyperspectral sensing may also often use a larger number of spectral bands than what is used in multi-spectral sensing.

Spectral sensing may be performed by spectrometers, which are dedicated devices for acquiring spectral content of an object. Spectrometers may come in many different variants, depending on what application the spectrometer is to be used in.

BRIEF DESCRIPTION OF THE SEVERAL VIEWS OF THE DRAWING(S)

DETAILED DESCRIPTION OF THE INVENTION

Detailed embodiments of the present disclosure will now be described with reference to the drawings.

A spectrometer comprises a sensor, which is arranged to detect an intensity of light of different wavelengths. The spectrometer comprises an optical module for directing light from an object towards the sensor. Thus, the spectrometer is able to record spectral data, which may provide information about the object.

Figure 1:
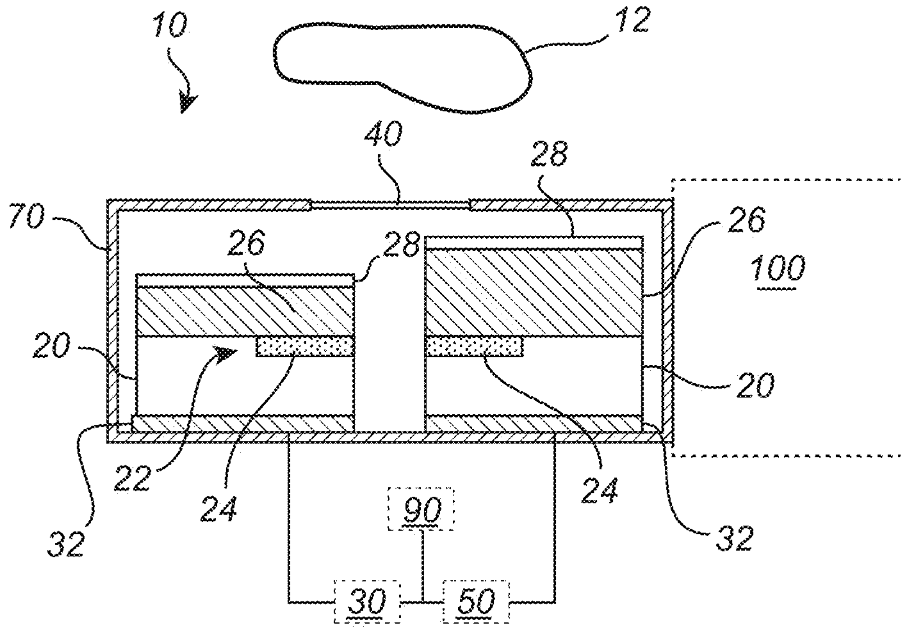
FIG. 1 is a schematic illustration of a spectrometer module in accordance with the present invention.

Referring now to FIG. 1, a spectrometer module 10 will be described. The spectrometer module 10 comprises components enabling recording of spectral data of an object 12 allowing, for example, analysis of the object 12 based on the recorded spectral data. The spectrometer module 10 may be a stand-alone unit but may alternatively be mounted in or on another device. The device in or onto which the spectrometer module 10 is mounted will in the following be referred to as a user device 100. The user device 100 may be any type of device that may communicate with the spectrometer module 10. The user device 100 may also have processing capability for processing recorded spectral data.

The spectrometer module 10 may comprise an electronic circuit module 20, which enables detecting incident light. The electronic circuit module 20 may comprise a light sensitive area 22. The light sensitive area 22 comprises one or more light detectors 24. A light detector 24 is arranged to capture light incident on the light detector 24, for example by converting incident light to an electric charge.

The light sensitive area 22 may be formed as any type of light-detecting circuitry. For instance, a charge coupled device (CCD) image sensor or a complementary metal-oxide-semiconductor (CMOS) image sensor may be used. The light-detecting circuitry may be adapted to a range of wavelengths to be detected by the light detectors 24. For instance, the light detectors 24 may use InGaAs, MCT or other detector substrates for detection of infrared light. Further, the light detectors 24 may be pixels of an image sensor.

The spectrometer module 10 may further comprise an optical module 40, which is arranged in relation to the electronic circuit module 20 for directing light from an object 12 towards the light sensitive area 22. The spectrometer module 10 may be arranged to detect selected wavelengths of light that is incident on each light detector. In this regard, the electronic circuit module 20 may comprise at least one filter 26, which is arranged on top of the light detector 24 for controlling a wavelength or band of wavelengths or a combination of bands of wavelengths of light that is allowed to pass through the filter 26 towards the light detector 24. A plurality of filters 26 may be provided for controlling wavelengths of light that are allowed to pass towards respective light detectors 24.

The plurality of filters 26 may constitute a filter bank having a plurality of wavelength-selective filters for controlling the wavelength of light incident on light detectors 24.

In combination, the light detectors 24 may allow for spectral sensing or multi-spectral sensing as light of a number of wavelengths may be detected.

The light detectors 24 may be arranged to detect selected wavelengths within a spectrum of visible light. However, the light detectors 24 may alternatively, or additionally, be arranged to detect selected wavelengths within other ranges, such as ultraviolet light, near infrared light or infrared light.

The plurality of filters 26 may be integrated with the electronic circuit module 20 for providing a fixed relationship between the filters 26 and the light detectors 24. The filters 26 may comprise Fabry-Pérot structures (not shown) having two reflective surfaces on respective sides of a cavity, wherein a thickness of the cavity may determine a narrow wavelength band that is allowed to pass towards the light detectors 24. The Fabry-Pérot filters may be designed for 1st order to maximize the free spectral range or use higher order designs for multi-resonance filtering. Multi-cavity filters may be used for a wider full-width at half-maximum (FWHM) of the filter. Thus, by varying the thickness of the cavity on top of respective light detectors 24, the light detectors 24 may be arranged to detect incident light of different wavelengths. Alternatively, other thin film based interference filter structures can be used, instead of or together with the Fabry-Pérot filters.

Alternatively, the spectrometer module 10 may comprise separate filters, which are mounted in relation to the electronic circuit module 20 such that a relationship between the filters and the light detectors 24 is fixed. Thus, the filters need not necessarily be integrated with the electronic circuit module 20. The spectrometer module 10 may also comprise a dispersive element, such as a grating, which is arranged to direct different wavelengths of light into slightly different directions. Thus, a mounting of the dispersive element in relation to the light detectors 24 may control which wavelength of light is directed towards the respective light detectors 24.

The light sensitive area 22 of the electronic circuit module 20 may comprise a plurality of light detectors 24. Each light detector 24 may be arranged to detect light of a selected wavelength, for example by arrangement of the light detector 24 in relation to a filter 26 as described above. The plurality of light detectors 24 may comprise a set of light detectors 24 that detect the same selected wavelength. The set of light detectors 24 may further be distributed over the light sensitive area 22, such that the light detectors 24 within a set are not adjacent to each other.

This implies that the plurality of light detectors 24 within a set may have slightly different relationships to the optical module 40 of the spectrometer module 10. This may be used in several ways for handling that the information about an object 12 as detected by the light detectors 24 may not be fully reliable. For instance, the different light detectors 24 within a set may detect light that originates from different portions of the object 12. Thus, if there is a spatial inhomogeneity of the object 12, such as local artifacts of the object 12, the plurality of light detectors 24 within the set may ensure that the inhomogeneity does not affect analysis of the object 12.

Also, an angle of incident light may affect detected light. For instance, the selected wavelength that is passed through the filter 26 towards the light detector 24 may depend on the angle. The plurality of light detectors 24 may have varying angular relationship to the optical module 40 and, hence, to the object 12 that is to be analyzed. Thus, if the spectrometer module 10 is arranged at a non-optimal angle in relation to the object 12, effects of the non-optimal angle may be diminished by using the fact that the plurality of light detectors 24 receive incident light at different angles.

This arrangement of the set of a plurality of light detectors 24 on the light sensitive area 22 is particularly advantageous for a spectrometer module 10, which is to be used in a handheld device, as an angular relation to the object 12 may not be very accurately controlled during recording of spectral data.

The plurality of light detectors 24 in the light sensitive area 22 may be arranged in a pattern, which is repeated on the light sensitive area 22. Each light detector 24 in the pattern may be arranged to detect incident light of a unique selected wavelength. Thus, the pattern may be arranged to record spectral data, whereas the repeating of the pattern implies that sets of plurality of light detectors 24 are formed having a plurality of light detectors 24 arranged to detect the same selected wavelength and distributed over the light sensitive area 22.

The light detectors within a single pattern on the light sensitive area 22, may detect incident light of different wavelengths from a common spatial portion of the object 12. Thus, repeating the pattern may allow recording spectral data from a plurality of spatial portions of the object 12.

The single pattern may include at least 8 different light detectors 24 in order to detect incident light of 8 unique selected wavelength bands. However, in other variations, the single pattern may include at least 32 different light detectors 24, or 64 different light detectors 24.

In some applications, the single pattern may include fewer light detectors 24, such as 4 different light detectors 24. The unique selected wavelengths may be selected for enabling detection of particular information, such as presence of a specific substance in the object 12. For such applications, it may be sufficient to detect light of only a few, but specifically selected and narrow-banded (less than 30 nm FWHM), selected wavelengths, such as 4 different wavelengths or even only 2 different wavelengths.

The light detectors 24 in the pattern may be arranged in a rectangular portion of the light sensitive area 22 in order to have a compact arrangement of the pattern on the light sensitive area 22. This may allow the light detectors 24 within the pattern to receive light from a common portion of the object 12.

The spectrometer module 10 may further comprise a rejection filter 28. The rejection filter 28 may be arranged to only allow wavelengths of light within a specific wavelength interval to pass through the rejection filter 28. This wavelength interval will be matched to the wavelengths of the wavelength bands sensed by the light detectors 24. The rejection filter 28 may thus be arranged to filter out wavelengths that may otherwise interfere with the detection of selected wavelengths in the light detectors 24.

For instance, a filter 26 having a Fabry-Pérot structure will pass several orders of wavelengths. Thus, if the light detector 24 is supposed to detect a wavelength of 400 nm, light having a wavelength of 800 nm may interfere with the detection. Further, a plurality of filters 26 of the electronic circuit module 20 may provide wavelength-selective filters of a wavelength interval within a sensitivity range of the light detectors 24. Thus, even if a filter 26 within the plurality of filters 26 filters a specific wavelength in the wavelength interval, the filter may still pass light having wavelengths outside the wavelength interval but within the sensitivity range of the light detectors 24. Thus, the rejection filter 28 may pass only light within the wavelength interval in which the plurality of filters 26 operate.

Thus, the light detectors 24 of an electronic circuit module 20 may be arranged to together detect light having wavelengths within a selected interval. The rejection filter 28 may then be arranged to pass only wavelengths of light within the selected interval.

The rejection filter 28 may be formed in a glass substrate, which has a coating for passing only wavelengths within the selected interval. The glass substrate may be bonded to the electronic circuit module 20 on top of the filters 26. As an alternative, the rejection filter 28 may be mounted in the spectrometer module 10, but not necessarily fixed to the electronic circuit module 20. As another alternative, separate rejection filters 28 may be arranged on top of different light detectors 24 and their respective filters 26 on the electronic circuit module 20. As another alternative, the rejection filters 28 can be deposited and may be patterned directly on top of the filters 26 that are in their turn on top of the electronic circuit module 20. As another alternative, the rejection filters 28 can make use of traditional RGB absorption filters or other post-processed absorption based filters. These absorption based filters may be used in combination with interference filters.

The electronic circuit module 20 may further comprise control circuitry 30 for controlling functionality of the spectrometer module 10. The control circuitry 30 may comprise circuitry for reading out detections of incident light made by the light detectors 24 and converting the read out detections to digital values in order to form spectral data. The control circuitry 30 may further comprise circuitry for performing initial processing of recorded spectral data and for transferring the initially processed spectral data to other units within or outside the spectrometer module 10.

The electronic circuit module 20 may be an integrated circuit which is arranged on a die 32. The logic controlling the functions of the electronic circuit module 20 may implemented in an Application-Specific Integrated Circuit (ASIC) on the die 32. Alternatively, the logic may be implemented as another type of integrated circuit, such as a Field-Programmable Gate Array (FPGA) on the die 32.

The light sensitive area 22 and the control circuitry 30 for controlling the light sensitive area 22 may be formed as any type of light-detecting circuitry. For instance, a charge coupled device (CCD) image sensor or a complementary metal-oxide-semiconductor (CMOS) image sensor may be used. The light-detecting circuitry may be adapted to a range of wavelengths to be detected by the light detectors 24. For instance, the light detectors 24 may use InGaAs, MCT or other IR-sensitive sensor types, for detection of infrared light. Further, the light detectors 24 may be pixels of an image sensor.

The electronic circuit modules 20 may be manufactured by means of forming the necessary circuitry on a semiconductor wafer. The filters 26 may be formed on the light sensitive area 22 through depositing of necessary layers on the wafer.

Different rejection filters 28 may also be formed on top of respective light detectors 24 to provide specially adapted rejection filters 28 on top of each light detector. The rejection filters 28 may then be provided as coating layers having appropriate characteristics for only passing wavelengths of within a selected interval. As an alternative, the rejection filter 28 may be integrated on a glass substrate. The glass substrate may be provided with a coating for passing only wavelengths within the selected interval.

The spectrometer module 10 may comprise a plurality of separate electronic circuit modules 20. The separate electronic circuit modules 20 may each be formed on a separate die 32. The dies 32 may be mounted close to each other in the spectrometer module 10. For instance, a spatial gap between adjacent dies 32 may be smaller than 500 μm, or even smaller than 100 μm. The placement of dies 32 close to each other facilitates that an optical module 40, which is common to the plurality of electronic circuit modules 20 may be used. The common optical module 40 may thus direct light from the object 12 towards the light sensitive areas 22 of all of the plurality of electronic circuit modules 20.

Each of the electronic circuit modules 20 may comprise an integrated sensor circuit including a light sensitive area 22 that occupies part of an area of the integrated sensor circuit. Further, the plurality of separate electronic circuit modules 20 may include a group of adjacent electronic circuit modules 20 mounted in the spectrometer module 10 and the light sensitive areas 22 of the electronic circuit modules 20 in the group are so arranged on the respective integrated sensor circuits that the group of adjacent electronic circuit modules 20 is mounted so that the light sensitive areas 22 of the adjacent electronic circuit modules 20 are arranged in vicinity of each other.

Figure 2:
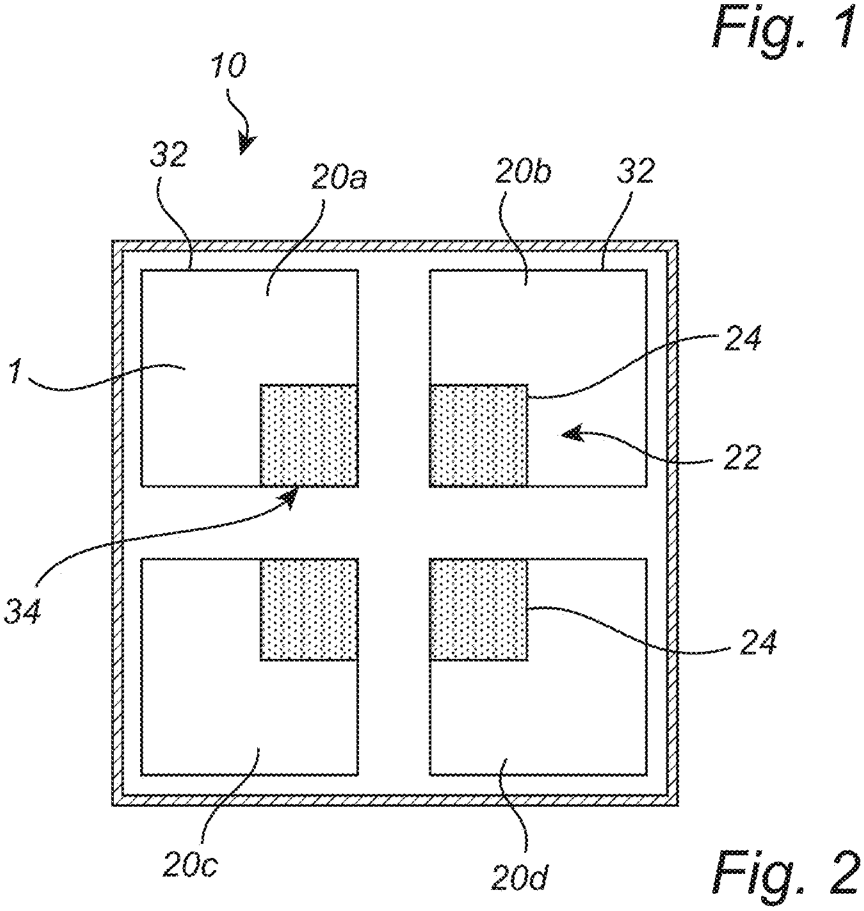
FIG. 2 is a schematic illustration of a layout of electronic circuit modules of the spectrometer module of FIG. 1 in accordance with the present invention.

As illustrated in FIG. 2, the light sensitive area 22 may be arranged at an edge portion 34 of the integrated sensor circuit. Hence, by arranging the light sensitive area 22 in a particular area of the integrated sensor circuit and specifically at the edge portion 34, it is possible to mount adjacent electronic circuit modules 20 in such a relationship that the light sensitive areas 22 become closely arranged in the spectrometer module 10. This arrangement further facilitates having an optical module 40 that is common to the plurality of separate electronic circuit modules 20.

According to an alternative, the group of adjacent electronic circuit modules 20 are mounted in a three-dimensional stack. Thus, depending on where an electronic circuit module 20 is arranged in the stack, the light sensitive areas 22 may be arranged at a portion of the respective integrated circuit such that the light sensitive areas 22 of adjacent electronic circuit modules 20 in the stack are arranged close to each other.

The plurality of electronic circuit modules 20 may be arranged to detect incident light of different wavelengths. By having separate electronic circuit modules 20, for example formed on separate dies 32, manufacture of each electronic circuit module 20 may be adapted to the specific requirements associated with the wavelengths of light to be detected by each respective electronic circuit module 20.

Each of the electronic circuit modules 20 may be arranged to detect incident light of a single wavelength, possibly using a plurality of light detectors 24. The spectrometer module 10 may still be arranged to detect a plurality of wavelengths allowing at least some specially adapted analyses to be made of objects 12 based on the recorded spectral data.

However, advantageously, each electronic circuit module 20 may comprise a plurality of light detectors 24, which are arranged to detect incident light of different wavelengths. The light detectors 24 together may detect light within a wavelength interval. The plurality of electronic circuit module 20 may then be arranged to detect light within different wavelength intervals. These wavelength intervals may (partially) overlap.

For instance, a first electronic circuit module 20*a* may be arranged to detect light within a wavelength interval of 200-400 nm, a second electronic circuit module 20*b* may be arranged to detect light within a wavelength interval of 400-600 nm, a third electronic circuit module 20*c* may be arranged to detect light within a wavelength interval of 600-800 nm, and a fourth electronic circuit module 20*d* may be arranged to detect light within a wavelength interval of 800-1000 nm. Within each of these wavelength intervals, the light detectors 24 of the electronic circuit modules 20*a-d* may be arranged to detect incident light of specific wavelengths. It should be noted that these wavelength intervals merely are intended to serve as examples and that other wavelength intervals are equally possible. Furthermore, it is even possible that some wavelength intervals overlap partially or completely.

The electronic circuit modules 20*a-d* may be configured in accordance with a wavelength interval that is to be detected by the light detectors 24. Thus, the spectrometer module 10 may for instance comprise an electronic circuit module 20*b* comprising a CMOS image sensor adapted to detect visible light and an electronic circuit module 20*d* comprising an InGaAs or chip for detecting infrared light. By allowing manufacture of the electronic circuit modules 20*a-d* to be performed separately, manufacture of a spectrometer module 10 spanning a broad wavelength range is facilitated.

The light sensitive area 22 may be arranged in a corner of the electronic circuit module 20. This allows mounting of four electronic circuit modules 20 in a 2×2 arrangement, wherein the light sensitive areas 22 are arranged in the vicinity of each other at a center of the arrangement. The light sensitive area 22 may be arranged along a side of the electronic circuit module 20. This allows mounting of two electronic circuit modules 20 in a side-by-side arrangement with the light sensitive areas 22 along the side closest to the adjacent electronic circuit module 20.

It should be realized that other mounting arrangements of the electronic circuit modules 20 may be contemplated. For instance, three electronic circuit modules 20 may be mounted in a triangular arrangement with the light sensitive area 22 of one electronic circuit module 20 being arranged along a bottom side of the electronic circuit module 20 and the light sensitive areas 22 of the two other electronic circuit modules 20 being arranged along a top side of the electronic circuit module 20.

The plurality of electronic circuit modules 20 may be mounted on a common substrate. For instance, the electronic circuit modules 20 may be mounted on a common PCB or a common chip, on which the spectral data recorded from each of the electronic circuit modules 20 may be combined. The plurality of electronic circuit modules 20 may be mounted in a common plane. The light sensitive areas 22 may thus be arranged in a common sensor plane, which may be a focal plane of the optical module 40 that is common to the plurality of electronic circuit modules 20.

The spectrometer module 10 may be arranged to detect a number of unique selected wavelengths, which may be selected in order to enable specific analysis of the spectral data. For instance, the wavelengths may be selected in such a way as to enable analysis or simple detection of a specific substance, anomaly or quality parameter. The number of unique selected wavelengths may be very few, such as only two, three or four wavelengths. However, a larger number of unique selected wavelengths may be used, such as 10, 20 or even 100 wavelengths.

Each of the separate electronic circuit modules 20 may be arranged to detect light of a single wavelength or a few wavelengths. A plurality of light detectors 24 of each electronic circuit module 20 may thus be used for providing a processed reading (for example an average, weighted average, median or other) of detected light of the specific wavelength(s) detected by the electronic circuit module 20, for example over a region of the object 12, or for relating the spectral data to different points on the object 12.

One example of using the spectrometer module 10 is within (pulse) oximetry or oxygenation monitoring, wherein a saturation of blood is related to a ratio or combinatorial processing of spectral intensities measured. Thus, by measuring light of the specific wavelengths appropriate for performing pulse oximetry, a saturation of blood may be determined. Alternatively, this approach can be used for food (meat, fish) quality/freshness detection or even for vegetable freshness (chlorophyl measurement instead of oxygenation).

The spectrometer module 10 may further comprise a memory 50. The memory 50 may be arranged as part of the electronic circuit module 20 or as part of one of the electronic circuit modules 20 if a plurality of electronic circuit modules 20 are used. Alternatively, the memory 50 may be arranged for example on a PCB or a chip, to which the electronic circuit module(s) 20 may also be connected, or in a three-dimensional stack of dies. The memory 50 may store predetermined correction data. The correction data may be used for correcting the spectral data recorded by the electronic circuit module 20.

The predetermined correction data may be used for correcting variations arising during manufacture of the spectrometer module 10. For instance, the filters 26 may not be perfectly formed and/or perfectly aligned with the light detectors 24. This implies that the light detectors 24 may detect light of a different wavelength than intended. The predetermined correction data may thus store a predetermined characteristic that allows correcting the wavelength detected by each light detector 24.

The predetermined correction data may also or alternatively be used for calibrating the recorded spectral data to sensitivities of the respective light detectors 24 or efficiency of the filter 26 on top of respective light detectors 24. Thus, the predetermined correction data may include a transmission efficiency of the light detectors 24 for correlating the detected light to the light that is actually incident on the filter 26. The correcting of the recorded spectral data will be further described below.

The memory 50 may also store other information that is relevant to the spectrometer module 10. The memory 50 may store metadata which should be output together with the recorded spectral data. Such metadata may be an identifier of the spectrometer module 10, which may be a unique number for uniquely identifying the spectrometer module 10 that has recorded the spectral data.

The memory 50 may also store programs, which may be launched into a processing unit of the spectrometer module 10 on start-up of the spectrometer module 10 for controlling functionality of the spectrometer module 10. The memory 50 may be a non-volatile memory, such as a read-only memory (ROM), an electrically erasable programmable read-only memory (EEPROM), or a flash memory. The memory 50 may be arranged to not lose data even if the spectrometer module 10 is turned off.

During manufacture of the spectrometer module 10, the spectrometer module 10 may be tested in order to obtain correction data that may be necessary for correcting recorded spectral data. This predetermined correction data may then be stored in the memory 50 before the spectrometer module 10 is shipped from manufacture.

The optical module 40 may be arranged in front of the one or more electronic circuit modules 20 for allowing light to pass into the spectrometer module 10 towards the light sensitive area(s) 22 of the one or more electronic circuit modules 20. In its simplest form, the optical module 40 may comprise an aperture, defining an entrance hole for receiving light into the spectrometer module 10. The optical module 40 may in one variation form an optical window, an aperture or a pinhole, wherein the light sensitive area(s) 22 form an image plane receiving light from the object 12.

However, the optical module 40 may comprise one or more lenses and/or lens systems, apertures, baffles, field-stops, pinholes and/or pinhole arrays for controlling how light from an object 12 passes through the optical module 40 and is directed towards the light sensitive area(s) 22. The optical module 40 may be arranged to control that light from a restricted part of the object 12 is directed to the light sensitive area(s) 22. Thus, an isolation of a spatial area that is analyzed by the spectrometer module 10 may be achieved by means of the optical module 40.

The optical module 40 may be arranged to control that different parts of the light sensitive area(s) 22 receive light from a common part of the object 12. Thus, the recorded spectral data may correspond to the same spatial area, such that the detected incident light of different wavelengths originate from a common part of the object 12. This implies that the optical module 40 may achieve homogenization of the part of the object 12 that is analyzed by different parts of the light sensitive area(s) 22.

Further, the wavelength selected by a filter 26 may depend on an angle of incidence of light onto the filter 26. Thus, in order for the desired selected wavelength to be passed through the filter 26, the optical module 40 may control light to incident onto the filter 26 substantially perpendicularly to a filter surface, or according to another desired angle. This implies that the optical module 40 may control angularity of light incident onto the light sensitive area(s) 22 or filters on top of the light sensitive area(s) 22.

The optical module 40 may have a static set-up which is adapted to the spectrometer module 10 recording spectral data in specific conditions. For instance, the spectrometer module 10 may be arranged to record spectral data of an object 12 that is to be placed at a specific distance from the spectrometer module 10. Then, a static set-up of the optical module 40 may optimize recording of spectral data at this specific distance. The static set-up may for instance provide an object 12 at the specific distance to be focused onto a focal plane of the optical module 40, and the light sensitive area(s) 22 may be placed in the focal plane.

The optical module 40 may comprise one or more components that may be actively controlled. For instance, an active lens may be controlled for changing focus of the optical module 40 or an aperture size may be controlled for changing a sampled area at a given distance from the spectrometer module 10. The optical module 40 may thus be dynamically controlled in order to adapt to conditions at which spectral data is to be recorded.

The optical module 40 may be arranged to be adapted to a set of finite number of conditions for recording spectral data. Thus, the optical module 40 may be controlled to switch characteristics, such as focus of the optical module 40, to optimize recording of spectral data in specific conditions within the finite number of conditions. For instance, the optical module 40 may switch between a set-up for contact measurement, where the spectrometer module 10 is in contact or very close proximity to the object 12, a set-up for short-distance measurement, where the spectrometer module 10 is at a short distance, for example 10 cm, from the object 12, and a set-up for long-distance measurement, where the spectrometer module 10 is at a longer distance, for example 5 m, from the object 12.

The optical module 40 may comprise specific coatings or materials to avoid reflections within the optical module 40. The optical module 40 may for example comprise anti-reflection coatings on components, such as lenses. The optical module 40 may also comprise one or more rejection filters for preventing light of undesired wavelengths to pass through the optical module 40.

As mentioned above, the optical module 40 may be common to light sensitive areas 22 of a plurality of electronic circuit modules 20. This implies that the optical module 40 may define a single optical pathway through the optical module 40 towards the light sensitive areas 22. For instance, an entrance aperture of the optical module 40 may be common to the light sensitive areas 22 for allowing light from the object 12 to enter the optical module 40 and to pass to the light sensitive areas 22.

Figure 3:
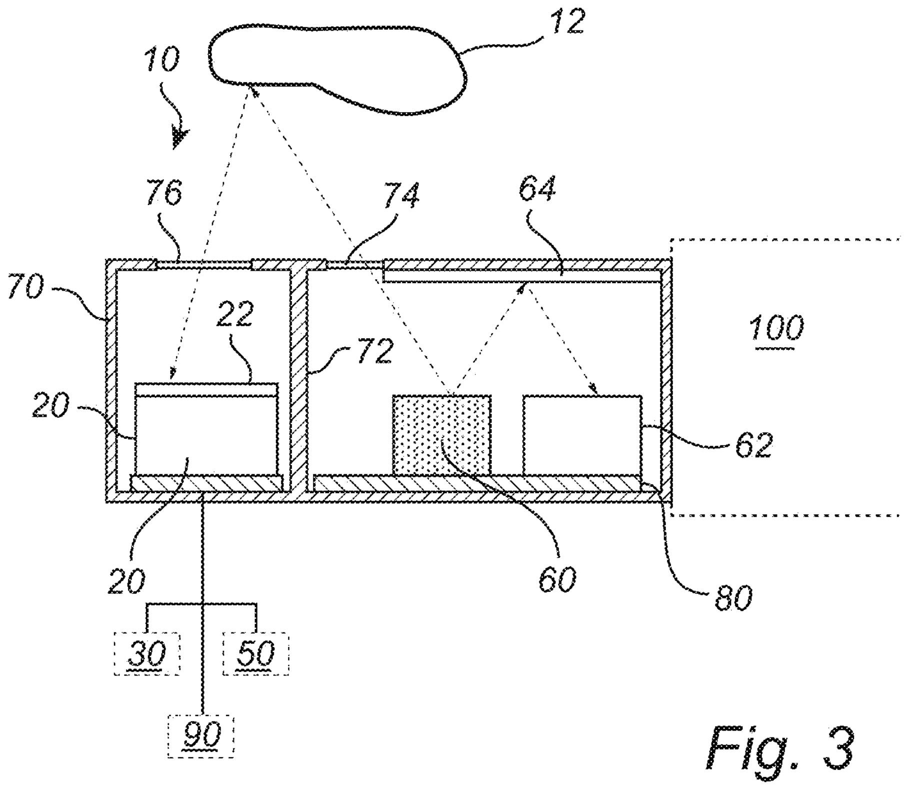
FIG. 3 is a schematic illustration of a spectrometer module including an illumination source in accordance with the present invention.

With reference to FIG. 3, the spectrometer module 10 may comprise an illumination source 60. The illumination source 60 may provide illumination of the object 12 with a desired spectral profile, which may improve possibilities to analyze the spectral data recorded.

The spectrometer module 10 need not necessarily comprise an illumination source 60. In many applications, the spectrometer module 10 may record spectral data based on an object that is illuminated by ambient light. Also, the illumination source 60 may not be arranged in the spectrometer module 10, but the spectrometer module 10 and the illumination source 60 may be arranged in a common user device 100. However, when the spectrometer module 10 comprises the illumination source 60, a controlled relation between the illumination source 60 and the light sensitive area(s) 22 may be obtained. The light sensitive area 22 may be arranged to detect incident light that has interacted with the illuminated object 12.

The illumination source 60 may for instance be an incandescent light, a light emitting diode (LED) source or a laser source, such as a vertical-cavity surface-emitting laser (VC- SEL). The illumination source 60 may illuminate the object 12 with a specific spectral profile that facilitates analysis of the object 12. The illumination source 60 may be controlled such that the spectral profile provided by the illumination source 60 may be changed.

The light from the illumination source 60 may interact with the object 12. Thus, the light may be for example diffusely or specularly reflected from the object 12, absorbed by the object 12, transmitted through the object 12 or scattered by the object 12. The recorded spectral data may then be analyzed based on e.g. absorbance of different wavelengths, which may for instance allow determination of whether a compound is present in the object 12.

The interaction of light with the object 12 may alternatively or additionally cause a shift in wavelength of the light, e.g. through florescence, Raman scattering or scattering by a moving object 12. The recorded spectral data may thus also or alternatively be analyzed to identify wavelength shifts, which may for instance allow determination of speed of a moving object 12 or determination of whether a compound is present in the object 12. The spectrometer module 10 may comprise a plurality of illumination sources 60. Thus, the spectral profile of the illumination to be provided may be controlled, for example by selecting which of a plurality of illumination sources 60 to be used. Also, the plurality of illumination sources 60 may together create a desired spectral profile of illumination.

The memory 50 may be provided with information defining the spectral profile of the illumination source 60. Further, the memory 50 may be provided with information defining the spectral profile of each of a plurality of illumination sources 60, such that when a specific illumination source 60 of the plurality of illumination sources 60 is selected, the spectral profile of the selected illumination source 60 may be retrieved from the memory 50. The spectrometer module 10 may further comprise a supplementary sensor 62. The supplementary sensor 62 may be arranged to receive light from the illumination source 60 in order to detect a spectral profile that is provided by the illumination source 60.

The spectral profile and intensity of the illumination source 60 may for example depend on ambient temperature, age of the illumination source 60, or whether manufacturing of the illumination source 60 is able to meet an ideal profile. Thanks to using the supplementary sensor 62, the actual spectral profile provided by the illumination source 60 may be detected and used in analysis of the recorded spectral data. Also, the supplementary sensor 62 may detect the spectral profile of a selected illumination source 60 from a plurality of illumination sources 60, such that the spectral profile used in illuminating the object 12 through controlling of which of the plurality of illumination sources 60 may be detected.

The supplementary sensor 62 may be mounted within the spectrometer module 10 such that light from the illumination source 60 propagates within the spectrometer module 10 to the supplementary sensor 62. Thus, the light emitted by the illumination source 60 is not affected by an ambience of the spectrometer module 10 before reaching the supplementary sensor 62. This ensures that the detected spectral profile by the supplementary sensor 62 is reliable.

The spectrometer module 10 may comprise a reflective surface 64, which may reflect light from the illumination source 60 to the supplementary sensor 62. This implies that a freedom of placing the supplementary sensor 62 in relation to the illumination source 60 is provided, which facilitates design of the spectrometer module 10. For instance, the reflective surface 64 allows arranging the supplementary sensor 62 in a common plane with the illumination source 60.

The spectrometer module 10 may comprise a housing 70, in which components of the spectrometer module 10 are mounted. The housing 70 may provide an outer cover of the spectrometer module 10, which may protect components within the spectrometer module 10 from, for example, dust or any other external factors that may otherwise influence a functionality of the spectrometer module 10.

The housing 70 of the spectrometer module 10 may thus facilitate transport of the spectrometer module 10 as a self-contained unit, for example from a manufacturing site to a site where the spectrometer module 10 is to be mounted in a user device 100. The housing 70 may also provide a defined simple shape of the spectrometer module 10, e.g. a rectangular parallelepiped, which may be simple to mount.

The housing 70 may also be provided with an outer physical interface, which may facilitate mounting the spectrometer module 10 onto a user device 100. The outer physical interface may, for example, comprise a flange or a protruding element so as to provide a surface that may be physically connected to a user device 100. The housing 70 may for example be formed of a plastic material, which may be easily molded to the desired shape. The housing may for instance be formed as a rectangular parallelepiped, which may be easily mounted in or on a user device 100.

The electronic circuit module 20 or the plurality of electronic circuit modules 20 may be mounted in the housing 70. Also, the illumination source 60 and the supplementary sensor 62 may be mounted in the housing 70. The electronic circuit module(s) 20, the illumination source 60 and the supplementary sensor 62 may be mounted in a common plane, which may enable the housing 70 to have a simple structure, such as a rectangular parallelepiped.

The housing 70 may be provided with a bottom structure, on which components of the housing 70 may be mounted. For instance, the electronic circuit component(s) 20, the illumination source 60 and the supplementary sensor 62 may be mounted on the bottom structure, which may be a bottom wall of the housing 70. The electronic circuit module(s) 20, the illumination source 60 and the supplementary sensor 62 may be mounted on a common PCB 80, which may be arranged on the bottom wall of the housing 70.

The housing 70 may further comprise side walls. The housing 70 may be provided with the bottom structure and side walls before mounting of components, such as the electronic circuit component(s) 20, the illumination source 60 and the supplementary sensor 62 in the housing 70. When the components have been mounted, a lid may be arranged on top of the side walls in order to seal the housing 70.

The housing 70 may further comprise a blocking element 72, which is arranged to obstruct light from the illumination source 60 to propagate within the housing 70 from the illumination source 60 to the light sensitive area(s) 22. Thus, the illumination source 60 may be mounted within the same housing 70 as the electronic circuit module(s) 20, without light from the illumination source 60 interfering with the light from the object 12 detected by the light sensitive area(s) 22. The blocking element 72 may for instance comprise a partition wall and/or baffles between the illumination source 60 and the electronic circuit module(s) 20.

The reflective surface 64 may be arranged on an inner wall of the housing 70 for reflecting light from the illumination source 60 to the supplementary sensor 62. An inner wall of the housing 70 may thus be provided at least partly with a coating, which reflects light. Alternatively, a reflective surface 64 may be mounted on the inner wall.

The housing 70 may be provided with a first aperture 74 for allowing light from the illumination source 60 to escape the housing 70 in a direction towards the object 12. The housing 70 may further comprise a second aperture 76 for allowing light that has interacted with the object 12 to pass into the housing 70 towards the light sensitive area(s) 22.

The first and second apertures 74, 76 may face a common direction. For instance, the first and second apertures 74, 76 may be arranged in a common side wall of the housing 70. The first and second apertures 74, 76 may be arranged in such manner that an illumination cone formed by light emitted from the illumination source 60 and escaping the housing 70 through the first aperture 74 overlaps a field of view of the light sensitive area(s) 22 through the second aperture 76. Thus, an object 12 in the field of view will be illuminated by the illumination source 60.

An optical axis of an optical system for recording the spectral data may also be angled, i.e. non-parallel, in relation to an optical axis of the illumination cone. This may help to ensure that the illumination cone overlaps the field of view of the light sensitive area(s) 22. The optical axis of the optical system may be angled in relation to the illumination cone by means of mounting the electronic circuit module(s) 20 in a plane, in which the illumination source 60 is not mounted, and arranging the optics module 40 in front of the plane in which the electronic circuit module(s) 20 are mounted. However, according to an alternative, the light from the object 12 is re-directed towards the electronic circuit module(s) 20, for example by means of components of the optics module 40, such that the electronic circuit module(s) 20 and the illumination source 60 may be mounted in a common plane.

The first and second apertures 74, 76 may be adapted to provide illumination of an object 12 when the object 12 is at a distance from the spectrometer module 10 at which the optical module 40 of the spectrometer module 10 is optimized for directing light from the object 12 towards the light sensitive area(s) 22. The optical module 40 may be mounted in the second aperture 76 of the housing 70 for directing light from the object 12 towards the light sensitive area(s) 22.

The first aperture 74 may be provided with a transparent material, such as a transparent plastic or glass, for allowing light to escape the housing 70, while preventing dust, for example, to enter the housing 70. The first aperture 74 may additionally or alternatively be provided with an optical element for controlling the shape of the illumination cone emitted via the first aperture 74.

The housing 70 may be provided with a single aperture, which is shared by the illumination source 60 for passing light from the illumination source 60 towards the object 12 and the light sensitive area(s) 22 for receiving light from the object 12. In this case, it may be particularly important that a part of the aperture through which light is passed from the illumination source 60 towards the object 12 is provided with an anti-reflection coating so as to prevent light from being reflected in the aperture towards the light sensitive area(s) 22.

The spectrometer module 10 may further comprise an electronic interface. The housing 70 may be provided with a plug connection for allowing connecting electronic components mounted in the housing 70 to an external unit. For instance, the spectrometer module 10 may be powered through the electronic interface. Also, the electronic interface may allow communication of information to and from components of the spectrometer module 10.

The electronic interface may comprise a single connection through a wall of the housing 70. Alternatively, two connections may be provided for powering the spectrometer module and communicating with the spectrometer module 10, respectively. Alternatively, the spectrometer module could be fully wireless, using wireless powering (inductive powering or charging or similar) and communication.

A simple electronic interface facilitates connecting the spectrometer module 10 to a user device 100. The spectrometer module 10 may thus be mounted on the user device 100 by physically connecting the spectrometer module 10 using the physical interface and electrically connecting the spectrometer module 10 using the electronic interface. The spectrometer module 10 may comprise a common carrier, such as a PCB, on which all electronic components, such as the electronic circuit component(s) 20, the illumination source 60 and the supplementary sensor 62, of the spectrometer module 10 are mounted.

The electronic interface may provide a connection to the common carrier and communication between an external unit and the electronic components may be performed via the common carrier. The spectrometer module 10 may comprise a communication unit for wireless communication. In such a case, the electronic interface of the spectrometer module 10 may only provide powering of the spectrometer module 10. However, the spectrometer module 10 may also be arranged to communicate with external units using both wired and wireless communication.

As schematically illustrated in FIGS. 1 and 3, the spectrometer module 10 may further comprise a processing unit 90. The processing unit 90 may be a microprocessor, which may be programmable for controlling operation of the microprocessor. For instance, the processing unit 90 may be a central processing unit (CPU).

The processing unit 90 may be arranged on a common PCB, on which also the electronic circuit component(s) 20, the illumination source 60 and the supplementary sensor 62 are mounted. The processing unit 90 may thus communicate with the electronic circuit component(s) 20, the illumination source 60 and the supplementary sensor 62 through connections on the common PCB. As an alternative, the processing unit 90, the electronic circuit component(s) 20, the illumination source 60 and the supplementary sensor 62 may all be mounted on a common chip, e.g. forming a system on a chip.

The processing unit 90 may alternatively be a special-purpose circuitry for providing only specific logical operations. Thus, the processing unit 90 may be provided in the form of an ASIC, ASIP or FPGA. The processing unit 90 may include a communication unit for communicating with an external unit. Alternatively, the communication unit may be a separate unit, which may also be mounted on a same PCB or same chip as the processing unit 90.

The communication unit may be arranged to communicate with an external unit through a wireless communication. In such cases, the communication unit may comprise an antenna for sending and receiving wireless signals, for example by means of radio frequency electromagnetic radiation. The communication unit may also or alternatively be arranged to communicate through a wired connection, as may be provided by means of the electronic interface described above.

The processing unit 90 may be arranged to control output from the spectrometer module 10. Thus, the processing unit 90 may receive recorded spectral data from the electronic circuit module(s) 20. The processing unit 90 may then arrange the recorded spectral data into a data package, for example with header information, which may be suitable for communication to an external unit. The data package may be suited for transfer on a computer network, such that the recorded spectral data may be transmitted from the spectrometer module 10, possibly via one or more intermediate external units to any computer in e.g. a local area network (LAN) or connected to Internet.

The processing unit 90 may process the recorded spectral data before outputting data from the spectrometer module 10. This may allow at least partial analysis of the recorded spectral data to be performed in the spectrometer module 10. For instance, the processing unit 90 may compare the recorded spectral data to a stored spectrum to output a decision based on the result of the comparison. The processing unit 90 may also or alternatively correct or process the recorded spectral data in accordance with correction data stored in the memory 50.

The processing unit 90 may control the functionality of the spectrometer module 10, outputting recorded spectral data on a specific electronic interface. Thus, the spectrometer module 10 may be easily embedded in a user device 100 or integrated into a system, as the spectrometer module 10 may be self-controlled and outputs recorded spectral data or at least partly processed data allowing another unit in the user device 100 to perform analysis on the recorded spectral data.

The data package output from the spectrometer module 10 may include recorded spectral data. Alternatively or additionally, the processing unit 90 may process the recorded spectral data as further described below. The spectrometer module 10 may then output the recorded spectral data with the processed data or, alternatively, only the processed data may be output. The processing of the recorded spectral data by the processing unit 90 may constitute initial steps for refining the recorded spectral data or a full analysis of the recorded spectral data or something in between.

However, the data package may further include other information, which may be useful, for instance, for analysis of the recorded spectral data. The other information may constitute metadata relating to the recorded spectral data. For instance, the metadata could include an identifier of the spectrometer module 10 that recorded the spectral data, as may be stored in the memory 50. The metadata could also include a date and time at which the spectral data was recorded.

The spectrometer module 10 may further comprise other sensors and information captured by such other sensors may be included as metadata. For instance, a geographical position of the spectrometer module 10 when recording the spectral data may be included in the data package as metadata.

Information of the spectral profile of the illumination source 60 as recorded by the supplementary sensor 62 may be included in the data package as metadata. The metadata may further comprise information relevant for processing the recorded spectral data. For instance, the memory 50 may store correction data as described above. This correction data may be included in the data package as metadata.

If the processing unit 90 is arranged to analyze the recorded spectral data, the spectrometer module 10 may output a result of the analysis. For instance, the memory 50 may store spectral signature information of a target compound. The processing unit 90 may thus compare the recorded spectral data against the stored spectral signature information to determine whether the object 12 includes the target compound. Then, the spectrometer module 10 may simply output a positive or negative result based on the analysis.

The recorded spectral data may be processed for refining the recorded spectral data. The refining of the recorded spectral data may correct or adjust the recorded spectral data to conditions under which the spectral data is recorded, or in view of characteristics of the spectrometer module 10.

If the plurality of light detectors 24 comprises a set of light detectors 24 that detect the same selected wavelength, which set of light detectors 24 is distributed over the light sensitive area 22, this may be used for refining the recorded spectral data. The different light detectors 24 in the set may receive light from slightly different parts of the object 12. Thus, in order to compensate for an artifact in the object 12, a correction algorithm may be applied to the detected light in the light detectors 24 in the set. For instance, an average of the detected light in the light detectors 24 in the set may be calculated and used as a measurement of the detected light of the wavelength to which the set is sensitive. Thus, the effect of a local artifact, which may affect the detected light in one or a few of the light detectors 24 in the set may be diminished.

The recorded spectral data may also or alternatively be processed using correction data. The correction data may be stored in the memory 50 of the spectrometer module 10 as described above, but may alternatively be stored in a memory of an external unit to which the recorded spectral data is transmitted. If the external unit receives spectral data from a plurality of spectrometer modules 10, the correction data may be stored in association with an identifier of the spectrometer module 10. The stored correction data may comprise one or more predetermined characteristics of the electronic circuit module(s) 20.

For instance, the electronic circuit module 20 may not be arranged to determine light of the intended wavelength, e.g. due to a manufacturing process not being perfect. Thus, the stored correction data may comprise a predetermined characteristic for adjusting the recorded spectral data to the wavelength that is actually detected.

The predetermined characteristic may comprise a center wavelength of a wavelength band that is detected by a light detector 24. The predetermined characteristic may further comprise center wavelengths for a plurality of light detectors 24 or even all light detectors 24. Thus, the wavelengths detected by the light detectors 24 may be known through the predetermined characteristic. The predetermined characteristic may also comprise an offset and slope, with regard to nominal design. The width of the wavelength band that is detected by the light detectors 24 may be constant even if the center wavelengths are not correctly achieved during manufacture of the spectrometer module 10. Thus, storing the center wavelength may be sufficient for knowing the wavelength band that is detected by the light detector 24.

However, the predetermined characteristic may also comprise a width of the wavelength band that is detected by the light detector 24, so that the wavelength band is known by the center wavelength and the width of the wavelength band. The predetermined characteristic may comprise the widths of the wavelength bands for a plurality of light detectors 24 or even all light detectors 24. Instead of the center wavelength and the width of the wavelength band, the predetermined characteristic may comprise a smallest wavelength and largest wavelength of the wavelength band that is detected by the light detector 24.

The light detectors 24 may be intended to detect light of selected wavelengths. The predetermined characteristic need not necessarily define the wavelength band detected by the light detector 24. Instead, the predetermined characteristic may comprise an indication of the deviation of the actually detected wavelength band from the intended wavelength band.

Further, the plurality of light detectors 24 may be arranged to detect light of different wavelengths within a wavelength interval. The relation between the wavelengths detected by different light detectors 24 may be constant even if the light detectors 24 are not manufactured to detect exactly the intended wavelengths. For instance, the thickness of cavities in Fabry-Pérot structures may be manufactured with a general deviation from the intended thickness. Thus, the wavelengths detected by the light detectors 24 may all be similarly moved from the intended wavelengths.

In this regard, the predetermined characteristic may comprise only information of the wavelength detected by one reference light detector 24, since the wavelengths detected by the other light detectors 24 may have a known relationship to the wavelength detected by the reference light detector 24. For instance, the predetermined characteristic may comprise the center wavelength of the wavelength band detected by the light detector 24, which detects light of a wavelength that is at a center of the wavelength interval detected by the plurality of light detectors 24. Alternatively, the predetermined characteristic may comprise the center wavelength of the light detector 24, which detects the smallest wavelength, or the center wavelength of the light detector 24, which detects the largest wavelength. As a further alternative, the predetermined characteristic may define the wavelength interval detected by the plurality of light detectors 24, for example by the predetermined characteristic comprising a smallest wavelength and largest wavelength of the wavelength interval.

The processing of the recorded spectral data using correction data that defines the wavelengths actually detected by the light detectors 24 may include adjusting an index of each detected intensity of light so that the detected intensity is related to the correct wavelength. The predetermined characteristics of the stored correction data may also or alternatively comprise a transmission loss that is relevant for a light detector 24. The predetermined characteristic may comprise the transmission losses for a plurality of light detectors 24 or for all light detectors 24.

The transmission loss may indicate how an intensity of light of a wavelength as detected by a light detector 24 relates to the intensity of light that is incident on the light detector 24 or on a filter 26 associated with the light detector 24. Thus, using the transmission loss, the intensity of incident light may be determined.

The processing of the recorded spectral data using correction data that defines the transmission loss relevant for the light detectors 24 may include adjusting the detected intensity of light using the transmission loss so that the actual intensity of light incident on the light detector 24 or on the filter 26 is provided.

The recorded spectral data may also or alternatively be processed in relation to characteristics of the illumination source 60. As described above, the supplementary sensor 62 may detect light from the illumination source 60. Thus, the supplementary sensor 62 may provide characteristics of the illumination source 60, such as an intensity of emitted wavelength(s), or a spectral profile of the illumination source 60.

The recorded spectral data may be corrected or processed in view of the characteristics of the illumination source 60. For instance, detected intensities of light in the recorded spectral data may be adjusted in relation to intensities of emitted light onto the object 12 to, for example, provide the detected intensity of light as a ratio to the emitted intensity of the respective wavelength. The processed spectral data may thus provide a reflectance of the object 12 that is corrected in view of the irradiance of the illumination source 60.

It should be realized that there may be other alternatives of correction or processing of the recorded spectral data in view of characteristics of illumination of the object 12. According to one alternative, the illumination may be constant and fixed, and a spectral profile of the illumination may thus be stored in the memory 50. The stored spectral profile may thus be used for correcting the recorded spectral data. According to another alternative, a spectral response from a specific object 12, such as a plant, may be well-known, such that an identification may be done that the recorded spectral data relates to the specific object and, depending on a shape of the recorded spectral data, a spectral profile of the illumination may be estimated. The recorded spectral data may thus be corrected based on the estimated spectral profile of illumination.

The recorded spectral data may further be processed in order to analyze the recorded spectral data. For instance, analysis of the object 12 may be made based on the recorded spectral data. The processing of the recorded spectral data to perform analysis may be based on the recorded spectral data as received from the electronic circuit module(s) 20 or on refined data as may be provided through one or more of the processing steps described above. Analysis of the recorded spectral data may be made in numerous different ways at different levels of complexity.

The recorded spectral data may be compared to a target spectral signature. Thus, the recorded spectral data may be matched against the target spectral signature in order to determine whether the recorded spectral data corresponds to the target spectral signature. If there is a correspondence, a conclusion may be drawn that, for example, a target compound is present in the object 12.

According to another alternative, the target spectral signature may be related to a specific state of the object. For instance, for pulse oximetry, the target spectral signature may be related to a threshold, providing a satisfactory saturation of blood. Hence, the recorded spectral data may be compared to the target spectral signature in order to determine whether saturation is satisfactory or not.

According to another alternative, recorded spectral data may be stored in the memory 50. Later recorded spectral data may then be processed based on the stored spectral data. For instance, the spectrometer module 10 may first be directed towards the sun or a lamp to obtain source spectral data, providing information of a light source. Then, object spectral data may be recorded from an object 12, and the object spectral data may be processed using the source spectral data in the memory 50. Processing of the recorded spectral data may be performed in the processing unit 90. The spectrometer module 10 may thus be arranged to output refined data or even result of analysis performed.

The processing of the recorded spectral data may alternatively be performed in an external unit, which receives the recorded spectral data from the spectrometer module 10. The processing may for instance be performed in a user device 100, on which the spectrometer module 10 is mounted. The processing may alternatively be performed by an external computer unit 200, which receives the recorded spectral data via a computer network 210.

It should also be realized that the processing of the recorded spectral data may be partly performed by several different units, such as the processing unit 90, a processing unit 120 of the user device 100 and/or an external computer unit 200 in a computer network 210.

The spectrometer module 10 may output the recorded spectral data or refined data together with information that may be used for performing further processing of the recorded spectral data, such as the correction data or an identifier of the spectrometer module 10. Processing of the recorded spectral data using information stored in the memory 50 may include predetermined operations. Thus, the spectrometer module 10 may comprise an integrated circuit that is specifically adapted to perform the predetermined operations. For instance, adjusting the recorded spectral data using the stored correction data may always use the same operations. Thus, the spectrometer module 10 may comprise a processing unit 90 in the form of an ASIC that performs the specific operation for adjusting the recorded spectral data.

The processing unit 90 may be arranged as a combination module, for example an ASIC, which receives the recorded spectral data and corrects wavelength information of the recorded spectral data using the stored correction data. The combination module may also or alternatively adjust a detected intensity in the recorded spectral data using a stored transmission loss.

The combination module may be provided on a chip of the spectrometer module 10, on which components, such as the electronic circuit module(s) 20, the illumination source 60 and the supplementary sensor 62, of the spectrometer module 10 are mounted. Thus, the spectrometer module 10 may be a very compact unit, providing on a single chip a possibility of recording spectral data and outputting refined data.

The spectrometer module 10 may be mounted on a user device 100, which may also include further components. A schematic illustration of a user device 100 is provided in FIG. 4. Thus, the user device 100 may include other sensors 110, a processing unit 120, which may control the sensors 110 and process data recorded by the sensors 110, etc.

The user device 100 may generally be any type of device that may communicate with the spectrometer module and may comprise processing capability for processing spectral data recorded by the spectrometer module 10. Thus, the user device 100 may for instance be a portable user device, such as a mobile phone, a digital camera, a laptop, a tablet PC, or a wearable user device, e.g. a smart watch. The user device 100 may alternatively be a dedicated or general sensor unit, which may provide a plurality of sensors, including the spectrometer module 10, for making measurements. Such a sensor unit may, for example, be used in an industrial application, such as for performing measurements relevant to an industry process.

The processing of the recorded spectral data may be performed by the processing unit 120 of the user device 100. The user device 100 may also comprise a memory 130, external to the spectrometer module 10, which may store correction data or other data that may be useful in the processing of the recorded spectral data. In such case, the spectrometer module 10 need not necessarily comprise the memory 50. The memory 130 of the user device 100 may be provided with correction data upon mounting of the spectrometer module 10 on the user device 100. Thus, the processing unit 120 may have access to correction data for processing the recorded spectral data.

The recorded spectral data may be transmitted to an external computer unit 200, for example over a computer network 210. The spectrometer module 10 may comprise a computer network interface for transmitting the recorded spectral data over the computer network. However, the spectrometer module 10 may output the recorded spectral data to an intermediated device, such as the user device 100, which may comprise a computer network interface for transmitting the recorded spectral data to the external computer unit 200.

The recorded spectral data may be transmitted to the external computer unit 200 together with the identifier of the spectrometer module 10. The external computer unit 200 may store data relevant for processing the recorded spectral data, such as correction data, in association with the identifier of the spectrometer module 10. Thus, the external computer unit 200 may be arranged to receive recorded spectral data from a number of spectrometer modules 10 and may be able to retrieve the relevant data, unique to each spectrometer module 10, for processing the recorded spectral data.

The spectrometer module 10 may be embedded in a user device 100. The spectrometer module 10 may be a self-contained unit, which is able to output recorded spectral data and/or refined data to the user device 100. The housing 70 of the spectrometer module 10 may thus be mechanically mounted on the user device 100, and the spectrometer module 10 may further be electrically connected to components on the user device 100 for, for example, providing power to the spectrometer module 10 and/or providing communication between the spectrometer module 10 and the user device 100.

The spectrometer module 10 need not necessarily comprise all components described above. The user device 100 may provide some or all functionalities of one or more components described above. The user device 100 may comprise a memory 130, which stores correction data that may be used in processing of the recorded spectral data. The memory 130 may also or alternatively store other information that may be useful in processing of the recorded spectral data, such as a target spectral signature.

The user device 100 may comprise a processing unit 120. The processing unit 120 may be a programmable general-purpose processor, such as a CPU. The processing unit 120 may thus be programmed for processing the recorded spectral data. A computer program may be stored in the memory 130 and may be loaded to the processing unit 120 for causing the processing unit 120 to perform desired processing of the recorded spectral data.

The user device 100 may also or alternatively comprises an illumination source, which may provide illumination of the object 12. Further, the user device 100 may comprise a supplementary sensor for detecting a spectral profile that is provided by the illumination source of the user device 100.

The user device 100 may provide other functionalities, which may use or complement recording of spectral data by the spectrometer module 10. For instance, the user device 100 may be a mobile phone, any wearable device, such as a watch, bracelet or spectacles, or any other type of computing device, such as a personal computer, a laptop or a tablet computer. The user device 100 may alternatively be a device which is designed for the purpose of recording spectral data incorporating the spectrometer module 10. Thus, the user device 100 may be a sensor unit, for example intended for use in an industrial application, which may combine the spectrometer module 10 with other sensors, a user interface for allowing a user to interact with the sensor unit and/or a network interface for communicating with external units.

The user device 100 may be a portable user device 100. The user device 100 may comprise a camera 150 adapted to acquire images. The camera may include a lens arrangement defining the field of view of the camera 150. The lens arrangement may have a fixed focal length (i.e. "a prime lens") or a variable focal length (i.e. "a zoom lens"). The lens arrangement may be a fixed-focus lens arrangement, a manual focus lens arrangement or an autofocus lens arrangement. The lens arrangement may collect incident light onto a digital image sensor such as a CCD or CMOS sensor wherein a digital image may be acquired and recorded as image data according to conventional methods. A recorded image may be stored in a data file in an appropriate image format in the memory 130 and/or on a removable media such as a non-volatile memory card inserted in a card slot of the user device 100.

The user device 100 may further comprise a display 160 providing a user interface. The display 160 may for example be of an LCD- or a LED-type or some other commercially available technology type. The user device 100 may further comprise an input device allowing the user to interact with the user interface of the user device 100. The input device may as is well-known in the art include one or more buttons and/or a touch screen overlaying the display 160.

The spectrometer module 10 may be a stand-alone device. The spectrometer module 10 may include a network interface for communicating with external units, for example by wireless communication. The spectrometer module 10 may be arranged on a carrier allowing the spectrometer module 10 to be placed or mounted in a position where recording of spectral data is desired. For instance, the spectrometer module 10 may be placed in an industrial environment, for example, for monitoring progress of an industrial process, such as a manufacturing process. The spectrometer module 10 may thus be arranged to output recorded spectral data, refined data and/or results of initial analysis of the recorded spectral data. The output may be received by an external unit which may further process the received data.

A system of spectrometer modules 10, which may be stand-alone devices or embedded in user devices 100, may be provided. Each spectrometer module 10 in the system may be arranged to record spectral data. For instance, the spectrometer modules 10 may be arranged to monitor different parts of an environment. Thus, the spectrometer modules 10 may be arranged to monitor different stages of an industrial process or may be arranged to record spectral data from adjacent areas.

The recorded spectral data from a plurality of spectrometer modules 10 may be used in combination in several different manners. The plurality of spectrometer modules 10 may monitor each stage of an industrial process in order to allow providing an alert as soon as a deviation occurs at any stage in the process. The plurality of spectrometer modules 10 may record spectral data from massively parallel objects to create a large database with information of objects over time.

The plurality of spectrometer modules 10 may record spectral data from a common object, for example from different parts of the object 12. Then, the recorded spectral data may be combined, for instance by averaging, in order to improve data quality or robustness of measurements. Also, the plurality of recorded spectral data may be used to remove outliers, which may be recorded from an irrelevant part of the object 12 or from an artifact in the object 12.

The plurality of spectrometer modules 10 in a system may transmit recorded spectral data to a common external unit 200, which may perform analysis based on the received data. As an alternative, one of the spectrometer modules 10 in the system may receive recorded spectral data from the other spectrometer modules 10.

Figure 4:
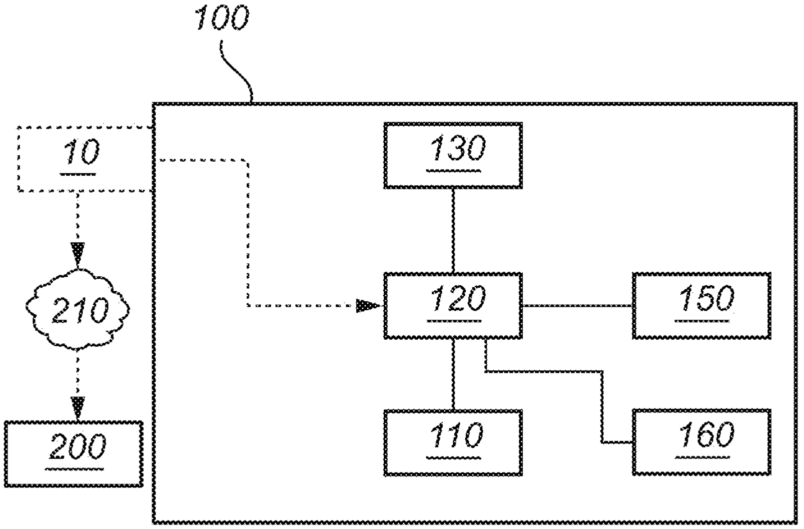
FIG. 4 is a schematic illustration of a user device including or supporting a spectrometer module in accordance with the present invention.

As described above a user device, such as the user device 100 illustrated in FIG. 4, may comprise a spectrometer module, such as the spectrometer module 10, which is adapted to acquire spectral information from a region within the scenery which falls within a field of view of the spectrometer module. As described in the above, the spectrometer module 10 may be embedded in the user device 100, or the spectrometer module 10 may be mounted externally onto the user device 100.

The user device 100 further includes a display, such as the display 160. The display 160 has a controllable spectral output. In particular the spectral output may be controllable in terms of at least one of an intensity (for example by controlling the brightness of the display 160) and a spectral content (for example by controlling a color displayed on the display 160).

A processing unit 120 of the user device 100 is adapted to control the spectral output of the display by outputting display data to the display 160. The display data may accordingly control the display 160 to display an image of a color and/or at a brightness level such that light having the desired spectral content is emitted from the display 160. For instance, the processing unit 120 may control the display 160 to display a single-color image or an image including two or more colors chosen such that light of a desired spectral content is emitted by the display 160. The spectral output may be a predetermined spectral output or user-selectable.

The light emitted by the display 160 may provide illumination of a region including a target of the spectrometer module 10, such as the object 12, with a desired spectral profile. To improve the ability of the display 160 to illuminate a target of a spectrometer module 10, the spectrometer module 10 may be embedded in, or mounted externally onto the user device 100, in such a manner that the spectrometer module 10 is directed in a same direction as the display 160. For instance the spectrometer module 10 may be arranged on a same side of the user device 100 as the display 160.

The processing unit 120 may further be adapted to receive spectral data from the spectrometer module 10 which represents the detected incident light from the target 12. Accordingly, a controlled relation between the spectral output of the display 160 and light sensitive area(s) 22 of the spectrometer module 10 may be obtained. The light sensitive area 22 may be arranged to detect incident light that has interacted with the illuminated object 12.

The light from the display 160 may interact with the object 12. Thus, the light may be for example diffusely or specularly reflected from the object 12, absorbed by the object 12, transmitted through the object 12 or scattered by the object 12. The spectrometer module 10 may detect light received from the object 12. The spectrometer module 10 may acquire spectral information about the received light and record the acquired spectral information as spectral data, for instance in the memory 50 of the spectrometer module 10. The recorded spectral data may then be analyzed based on e.g. absorbance of different wavelengths, which may for instance allow determination of whether a compound is present in the object 12.

The interaction of light with the object 12 may alternatively or additionally cause a shift in wavelength of the light, e.g. through florescence, Raman scattering or scattering by a moving object 12. The recorded spectral data may thus also or alternatively be analyzed to identify wavelength shifts, which may for instance allow determination of speed of a moving object 12 or determination of whether a compound is present in the object 12.

By virtue of having access to the display data controlling the spectral output of the display 160, the processing unit 120 may output adjusted spectral data corrected on the basis of data representing the spectral output of the illumination source and the spectral data recorded by the spectrometer module 10.

The recorded spectral data may accordingly be processed for refining the recorded spectral data. The refining of the recorded spectral data may correct or adjust the recorded spectral data in view of the spectral output of the display 160. As described in detail above the recorded spectral data may additionally be corrected or adjusted in view of conditions under which the spectral data is recorded, or in view of characteristics of the spectrometer module 10.

Thus, display data provided by the processing unit 120 for the purpose of controlling the spectral output of the display 160 may provide information on the spectral output of the display 160, such as an intensity of emitted wavelength(s). The recorded spectral data may be corrected or processed in view of the information on the spectral output of the display 160. For instance, detected intensities of light in the recorded spectral data may be adjusted in relation to intensities of emitted light onto the object 12 to, for example, provide the detected intensity of light as a percentage of the emitted intensity.

As an alternative to actually refining the recorded spectral data, the processing unit 120 may be adapted to output spectral data received from the spectrometer model 10 along with data representing the spectral output of the illumination source. The spectral data may then be refined during post-processing in a manner similar to what was described above in relation to the processing unit 120.

In various user scenarios of a spectrometer module, such as the spectrometer module 10, it may be advantageous to facilitate acquisition of spectral data from an intended region within a scenery, such as the object 12. Accordingly, a user device, such as the user device 100 illustrated in FIG. 4, may be arranged to provide assistance for a user in targeting the spectrometer module 10, i.e. directing the spectrometer module 10 towards a target. As described in the above, a spectrometer module 10 may be embedded in a user device 100, or a spectrometer module 10 may be mounted externally onto the user device 100.

The user device 100 includes a camera 150 which is adapted to acquire at least one image of a scenery which falls within a field of view of the camera 150. The spectrometer module 10 of the user device 100 is adapted to acquire spectral information from a region within the scenery which falls within a field of view of the spectrometer module 150.

For the purpose of providing targeting assistance, a processing unit 120 of the user device 100 is adapted to determine a target area of the spectrometer module 10, within the at least one image, corresponding to the region which falls within the field of view of the spectrometer module 10, and to output display data to a display 160 of the user device 100 for providing an indication of the target area on the display 160. The determined target area may be defined as an area of the at least one image which maps or depicts the region within the scenery. The operations of the processing unit 120 may be implemented by a computer program which may be stored in a memory 130 of the user device 100 and may be loaded to the processing unit 120 for causing the processing unit 120 to perform the desired operations.

In more detail, upon activation of a measuring/spectrometry mode of the user device 100 (for example, by the user of the user device 100 activating the mode by interaction via the input device of the user device 100), the camera 150 may be activated and adapted to initiate acquisition of a sequence of images. The images, which alternatively may be referred to as frames, may be stored in the memory 130 of the user device 100 or in a dedicated buffer (such as a FIFO-type frame buffer). The camera 150 may acquire the images at a fixed frame rate, as a non-limiting example 24-30 frames per second. Additionally, upon activation of the measuring mode, the spectrometer module 10 may be adapted to repeatedly (i.e. at a given acquisition rate) acquire spectral information from the region falling within the field of view of the spectrometer module 10 and provide the same to the processing unit 120.

For each image of the sequence the processing unit 120 may generate and output display data to the display 160 for providing an indication of the target area of the spectrometer module 10 on the display 160. The acquired sequence of images or frames may be displayed as a video stream on the display 160, thereby providing real-time feedback to the user of the scenery currently viewed by the camera 150 together with the indication of the target area.

Figure 5:
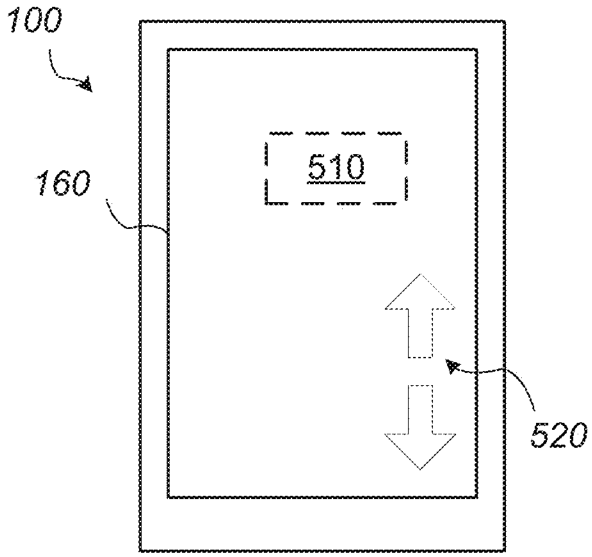
FIG. 5 is a schematic illustration of a user device providing target assistance for a user in accordance with the present invention.

The processing unit 120 may generate and output display data to the display 160 for providing an indication of the target area of the spectrometer module 10 on the display 160 by means of a graphical representation of the target area within each frame of the video stream. As schematically illustrated in FIG. 5 the graphical representation may include a graphical element enclosing the target area 510, such as a bounding box. The graphical representation may also include highlighted image pixels within the target area. The processing device 120 may be adapted to determine the spectrometer module target area based on information representing a position of the target area in an acquired image.

The information representing a position of the target area in an acquired image may be predetermined information. The information may be determined (for instance at the assembly stage of the user device 100 and the spectrometer module 10) by establishing, for a given distance between the target of the spectrometer module 10 and the spectrometer module 10, the set or area of pixels of an image acquired with the camera 150, which maps or depicts the region viewed by the spectrometer module 10. The predetermined information may hence indicate the set or area of pixels which maps or depicts the region viewed by the spectrometer module 10. The information may be stored in the user device 100 in a manner allowing the processing device 120 to gain access to the information (for example, in the memory 130). For instance if the target area is indicated by a graphical element enclosing the target area 510, such as a bounding box, or by highlighted image pixels within the target area, the information representing a position of the target area in an acquired image may include the coordinates of the bounding box or of the pixels to be highlighted.

In use of the user device 100 and the spectrometer module 10 (for example, in the measuring/spectrometry mode of the user device 100) the processing device 120 may accordingly determine the target area by accessing the information and generate and output display data for indicating the target area within each acquired image. Said given distance may be referred to as a "measurement distance" or "target distance" and may represent a focus distance of the optical module 40 of the spectrometer module 10 or an optimum measurement distance of the spectrometer module 10.

The processing unit 120 may be adapted to retrieve focus data indicating a focus distance of the camera 150 during acquisition of an image. The focus data may be obtained from metadata generated by a controller of the camera 150 and associated with the acquired image. Alternatively the camera 150 may be arranged to output focus data to the processing unit 120 via an internal communications interface of the user device 100.

The processing unit 120 may be adapted to compare the focus distance of the camera 150 to the above-mentioned target distance of the spectrometer module 10 and to output user-perceptible information based on a result of the comparison.

Advantageously the processing unit 120 may be adapted to control the camera 150 to focus on a feature in the region which feature is depicted within the target area. Thereby the relevance of the comparison between the focus distance and the target distance may be ensured since the focus data will represent the distance to the feature in the region.

For instance, if the comparison indicates that the focus distance of the camera 150 differs from the target distance of the spectrometer module 10 the user-perceptible information may indicate that the target of the spectrometer module 10 is not in focus in the acquired image. Additionally or alternatively the user-perceptible information may indicate that the target distance of the spectrometer module 10 is greater than the focus distance of the camera 150 (if the focus distance of the camera 150 is smaller than the target distance of the spectrometer module 10) or indicate that the target distance of the spectrometer module 10 is smaller than the focus distance of the camera 150 (if the focus distance of the camera 150 is greater than the target distance of the spectrometer module 10). The user may accordingly be guided to move the user device 10 closer to or further away from the target. When the focus distance matches the target distance the spectrometer module 10 may acquire spectral information from the target region. The acquisition may be performed automatically in response to the processing unit 120 detecting that the focus distance of the camera 150 matches the target distance of the spectrometer module 10.

The user-perceptible information may include one or a combination of visible information via the display (for example, in the form of text or other graphical elements), audible information via a speaker of the user device 100 (for example, in the form of a synthesized or recorded voice) and tactile information via a vibratory unit of the user device 100 (for example, wherein a frequency of the vibration is varied depending on the result of the comparison). As schematically illustrated in FIG. 5 arrows 520 guiding the user to move the user device 100 into (arrow pointing upward) or out of the (arrow pointing downward) scenery may be shown on the display 160.

As an alternative to the processing device 120 determining a spectrometer module target area based on predetermined information representing a position of the target area in an acquired image, the processing device 120 may be adapted to determine the spectrometer module target area based on information relating the field of view of the spectrometer module 10 to the field of view of the camera 150. The information may include the relative orientations of the optical axis of the camera 150 and the spectrometer module 10, respectively, and the angle of the cone representing the field of view of the camera 150 and the field of view of the spectrometer module 10, respectively. The spectrometer module target area may thus be calculated during use of the user device 100 (for example, in the measuring/spectrometry mode of the user device 100). For a given distance between the target of the spectrometer module 10 and the spectrometer module 10 (for example, as determined on the basis of focus data from the camera 150) the area of pixels of an image (i.e. the target area), acquired with the camera 150, which maps or depicts the region viewed by the spectrometer module 10 may thus be determined.

An alternative manner of providing assistance for a user in targeting the spectrometer module 10, i.e. directing the spectrometer module 10 towards a target, will now be described wherein, for the purpose of providing targeting assistance, the processing unit 120 of the user device 100 is adapted to determine an RGB equivalent corresponding to the spectral information acquired by the spectrometer module 10 from the region and to output display data to a display 160 of the user device 100 for providing an indication of the RGB equivalent on the display 160.

The processing unit 120 may implement a conversion function taking spectral information acquired by the spectrometer module 10 as an input and outputting an RGB equivalent corresponding to the spectral information input.

The spectrometer module 10 may be adapted to repeatedly (i.e. at a given acquisition rate) acquire spectral information and provide the same to the processing unit 120. The processing unit 120 may be adapted to determine an RGB equivalent corresponding to each acquisition of spectral information by the spectrometer module 10 and repeatedly output display data to the display 160 for providing an indication of an RGB equivalent corresponding to each acquisition of spectral information. The user of the user device 100 may thereby gain a visual real-time feedback on a current target of the spectrometer module 10 and thereby be assisted with targeting of the spectrometer module 10.

The user device 100 may include a camera, such as the camera 150, which is adapted to acquire a sequence of images of the scenery. The processing unit 120 may be adapted to output display data to the display 160 for displaying the sequence of images and an indication of the RGB equivalent within or along with (for instance adjacent to) each image.

In more detail, upon activation of a measuring/spectrometry mode of the user device 100 (for example, by the user of the user device 100 activating the mode by interaction via the input device of the user device 100), the camera 150 may be activated and adapted to initiate acquisition of a sequence of images. The images, which alternatively may be referred to as frames, may be stored in the memory 130 of the user device 100 or in a dedicated buffer (such as a FIFO-type frame buffer). The camera 150 may acquire the images at a fixed frame rate, as a non-limiting example 24-30 frames per second. Additionally, upon activation of the measuring mode, the spectrometer module 10 may be adapted to repeatedly (i.e. at a given acquisition rate) acquire spectral information and provide the same to the processing unit 120.

For each image of the sequence the processing unit 120 may generate and output display data to the display 160 for displaying the sequence of images and an indication of an RGB equivalent corresponding to each acquisition of spectral information by the spectrometer module 10.

The sequence of images or frames acquired by the camera 150 may be displayed as a video stream on the display 160, thereby providing real-time feedback to the user of the scenery currently viewed by the camera 150. The processing unit 120 may generate and output display data to the display 160 for displaying an indication of a current RGB equivalent together (i.e. adjacent to or overlaying) each frame of the video sequence.

An alternative manner of providing assistance for a user in targeting the spectrometer module 10, i.e. directing the spectrometer module 10 towards a target, will now be described wherein, for the purpose of providing targeting assistance, the processing unit 120 of the user device 100 is adapted to compare the spectral information acquired by the spectrometer module 10 to a predetermined target spectrum.

The processing unit 120 may provide an output signal indicating the degree of correspondence between the acquired spectral information and the predetermined target spectrum. The output signal may for instance control the user device 100 to output user-perceptible information indicating the degree of correspondence to the user of the user device 100. The user-perceptible information may include one or a combination of visible information via the display, audible information via a speaker of the user device 100 and tactile information via a vibratory unit of the user device 100.

Alternatively, the output signal need not indicate an actual degree of correspondence between the acquired spectral information and the predetermined target spectrum but may merely indicate that a sufficient degree of correspondence has been determined (i.e. a spectral match), for instance in response to the processing unit 120 determining that a degree of correspondence exceeding a predetermined threshold.

Figure 6:
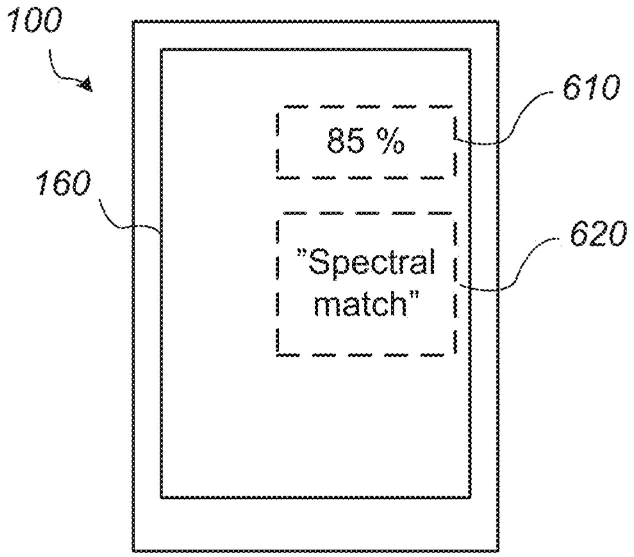
FIG. 6 is a schematic illustration of a user device providing target assistance for a user in accordance with the present invention.

Visible information provided via the display 160 may for instance be in the form of text indicating the degree of correspondence (for example, as a percentage or ratio) or that a spectral match has been determined (for example, "Acquired spectrum matches the predetermined target spectrum"). Visible information provided via the display may also be in the form of a graphical representation indicating the degree of correspondence (for example, by a symbol of an intensity or color which varies in a manner correlated with the degree of correspondence, such as from low intensity to high intensity or from a light color to an intense color) or that a spectral match has been determined (for example, by a symbol with a dashed outline changing to a solid outline when a spectral match has been determined, or by a symbol without a fill color changing to a symbol with a distinct fill color when a spectral match has been determined). FIG. 6 illustrates two different examples of text-based visible information 610, 620 provided on the display 160 of the user device 100.

Audible information provided via a speaker of the user device 100 may for instance be in the form of an audible signal indicating the degree of correspondence (for example, by a synthesized or recorded voice announcing a degree of correspondence as a percentage or ratio, or by a sounding signal with a frequency which varies in a manner correlated with the degree of correspondence such as between low to high frequency) or that a spectral match has been determined (for example, by a synthesized or recorded voice announcing that a spectral match has been determined, or by a sounding signal being activated when a spectral match has been determined).

Tactile information provided via a vibratory unit of the user device 100 may for instance be in the form of a vibration indicating the degree of correspondence (for example, by a vibration with a frequency or amplitude which varies in a manner correlated with the degree of correspondence such as between a low to high frequency or between a low to a high amplitude).

The processing unit 120 may for instance be arranged to determine the degree of correspondence by estimating an overlap between the acquired spectral information and the predetermined spectrum. The processing unit 120 may for instance be arranged to calculate a cross-correlation of the acquired spectral information and the predetermined spectrum.

The spectrometer module 10 may be adapted to repeatedly (i.e. at a given acquisition rate) acquire spectral information and provide the same to the processing unit 120. The processing unit 120 may be adapted to compare each acquisition of the spectral information by the spectrometer module 10 to the predetermined target spectrum and provide an output signal indicating the degree of correspondence and/or that a spectral match has been determined. The user of the user device 100 may thereby gain a real-time feedback on a current target of the spectrometer module 10 and thereby be assisted with targeting of the spectrometer module 10.

The acquisition of the spectral information by the spectrometer module 10 may be initiated upon activation of a measuring/spectrometry mode of the user device 100 (for example, by the user of the user device 100 activating the mode by interaction via the input device of the user device 100).

In response to the processing unit 120 determining that a spectral match has been determined, or in response to the user providing a user command via the input device of the user device 100, the spectrometer module 10 may initiate a time-resolved acquisition mode wherein the spectrometer module 10 may repeatedly, at a given acquisition rate, acquire spectral information of the current target. Each acquisition of spectral information by the spectrometer module 10 may be stored as a data set representing a time-resolved spectrum of the target.

For instance the predetermined target spectrum may represent a spectral profile of an oxygenated tissue or blood sample. The user may be informed by user perceptible information provided by the user device 100 when the user device 100 is oriented such that the spectrometer module 10 acquires spectral information from the tissue or sample. A time-resolved spectrum of the tissue or sample may thereafter be acquired which may provide information regarding blood pulsation or other oximetry information.

The foregoing is illustrative of example embodiments and is not to be construed as limiting thereof. Although example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims. It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) “configured to”, “operably coupled to”, “coupled to”, and/or “coupling” includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as “coupled to”.

As may even further be used herein, the term “configured to”, “operable to”, “coupled to”, or “operably coupled to” indicates that an item includes one or more of power connections, input(s), output(s), etc., to perform, when activated, one or more its corresponding functions and may further include inferred coupling to one or more other items. As may still further be used herein, the term “associated with”, includes direct and/or indirect coupling of separate items and/or one item being embedded within another item.

As may be used herein, the term “compares favorably”, indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term “compares unfavorably”, indicates that a comparison between two or more items, signals, etc., fails to provide the desired relationship.

As may be used herein, one or more claims may include, in a specific form of this generic form, the phrase “at least one of a, b, and c” or of this generic form “at least one of a, b, or c”, with more or less elements than “a”, “b”, and “c”. In either phrasing, the phrases are to be interpreted identically. In particular, “at least one of a, b, and c” is equivalent to “at least one of a, b, or c” and shall mean a, b, and/or c. As an example, it means: “a” only, “b” only, “c” only, “a” and “b”, “a” and “c”, “b” and “c”, and/or “a”, “b”, and “c”.

As may also be used herein, the terms “processing module”, “processing circuit”, “processor”, “processing circuitry”, and/or “processing unit” may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a “start” and/or “continue” indication. The “start” and “continue” indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A user device comprising:

a spectrometer module adapted to acquire spectral information and output spectral data representative of the acquired spectral information;

a memory adapted to store calibration data;

a processing unit; and at least one electronic circuit module, having a plurality of light detectors, wherein each light detector of the plurality of light detectors is adapted to detect light associated with a desired wavelength interval, wherein light detected by the plurality of light detectors together provide light in a spectrum of wavelength intervals, wherein the calibration data includes a relative light sensitivity for correcting a wavelength of light detected by each light detector, wherein the light detected by each light detector has a known relationship to a wavelength detected by a reference light detector.

2. The user device according to claim 1, wherein the calibration data includes at least one of:

information representative of a center wavelength of a wavelength band detected by the reference light detector in a light sensitive area associated with a set of light detectors of the plurality of light detectors; and information representative of a wavelength width of a wavelength band detected by the reference light detector in a light sensitive area associated with a set of light detectors of the plurality of light detectors.

3. The user device according to claim 1, wherein the reference light detector is configured to detect a center of a wavelength interval for light of a wavelength that is detected by a light detector of the plurality of light detectors.

4. The user device of claim 1, wherein the calibration data further includes information representative of a transmission loss associated with a light detector.

5. The user device of claim 1, wherein the at least one electronic circuit module includes a plurality of filters for selectively transmitting wavelengths of light towards respective light detectors, wherein at least some filters of the plurality of filters are Fabry-Pérot structures.

6. The user device of claim 1, wherein correcting light detected by each light detector includes adjusting an index so that a detected intensity is related to an associated correct wavelength.

7. A spectrometer module comprises:

at least one electronic circuit module comprising a light sensitive area for detecting incident light of a plurality of wavelengths within a set wavelength interval, wherein detected light of a plurality of wavelengths forms spectral data and the light sensitive area includes a plurality of light detectors, wherein each light detector of the plurality of light detectors is configured to detect light of a selected wavelength;

a memory adapted to store calibration data; and a processing unit configured to correct the spectral data using the stored calibration data, wherein the stored calibration data includes a relative light sensitivity for each light detector of the plurality of light detectors wherein the wavelength detected by each light detector has a known relationship to a wavelength detected by a reference light detector.

8. The spectrometer module according to claim 7, wherein the calibration data includes any one of:

information representative of a center wavelength of a wavelength band detected by a the reference light detector in the light sensitive area; and information representative of a wavelength width of a wavelength band detected by the reference light detector in the light sensitive area.

9. The spectrometer module of claim 7, wherein the calibration data includes information representative of a transmission loss associated with a light detector in the light sensitive area.

10. The spectrometer module of claim 7, wherein the reference light detector is configured to detect light of a wavelength that is at a predetermined center of a wavelength interval.

11. The spectrometer module of claim 7, wherein the at least one electronic circuit module comprises a plurality of filters for selectively transmitting wavelengths of light towards respective light detectors, wherein at least some filters of the plurality of filters are Fabry-Pérot structures.

12. The spectrometer module of claim 7, wherein correcting the spectral data using the stored calibration data includes adjusting an index of each detected intensity of light so that a detected intensity is related to an associated correct wavelength.

13. A method comprising:

storing, in memory, calibration data for correcting spectral data;

detecting, by an electronic circuit module, incident light, wherein the electronic circuit module includes a light sensitive area configured to detect light of a plurality of wavelengths within a set wavelength interval, wherein detected light of a plurality of wavelengths forms spectral data and the light sensitive area includes a plurality of light detectors, wherein a light detector of the plurality of light detectors is configured to detect light of a selected wavelength; and correcting, by a processing unit, spectral data using the calibration data, wherein the calibration data includes information representative of a relative light sensitivity for correcting a wavelength detected by each light detector of the plurality of light detectors, wherein the wavelength detected by each light detector has a known relationship to a wavelength detected by a reference light detector.

14. The method of claim 13, wherein the calibration data includes any one of:

a center wavelength of a wavelength band detected by a the reference light detector in the light sensitive area; and a wavelength width of a wavelength band detected by the reference light detector in the light sensitive area.

15. The method of claim 13, wherein the calibration data includes a transmission loss associated with a light detector in the light sensitive area.

16. The method of claim 13, wherein the reference light detector is configured to detect light of a wavelength that is at a center of a wavelength interval detected by a light detector of the plurality of light detectors.

17. The method of claim 13, wherein the electronic circuit module comprises a plurality of filters for selectively transmitting wavelengths of light towards respective light detectors, wherein at least some filters of the plurality of filters are Fabry-Pérot structures.

18. The method of claim 13, wherein correcting the spectral data using the calibration data includes adjusting an index of each detected intensity of light so that a detected intensity is related to an associated correct wavelength.

* * * * *